Dec. 13, 1960
P. TASHMAN
2,963,957
ROAST CARVING ASSEMBLY
Filed Feb. 2, 1959
2 Sheets-Sheet 1
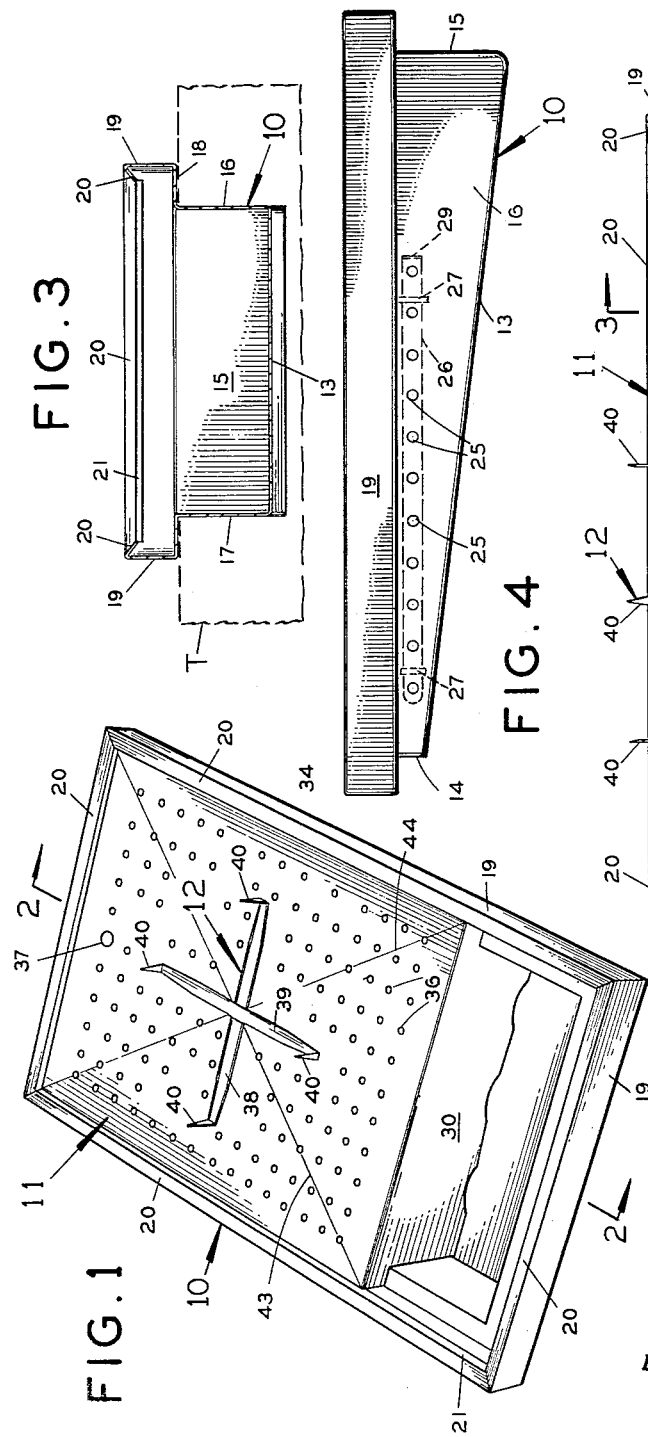
INVENTOR.
PHILIP TASHMAN
BY E.H. Schmidt
ATTORNEY Dec. 13, 1960 P. TASHMAN 2,963,957
ROAST CARVING ASSEMBLY
Filed Feb. 2, 1959 2 Sheets-Sheet 2
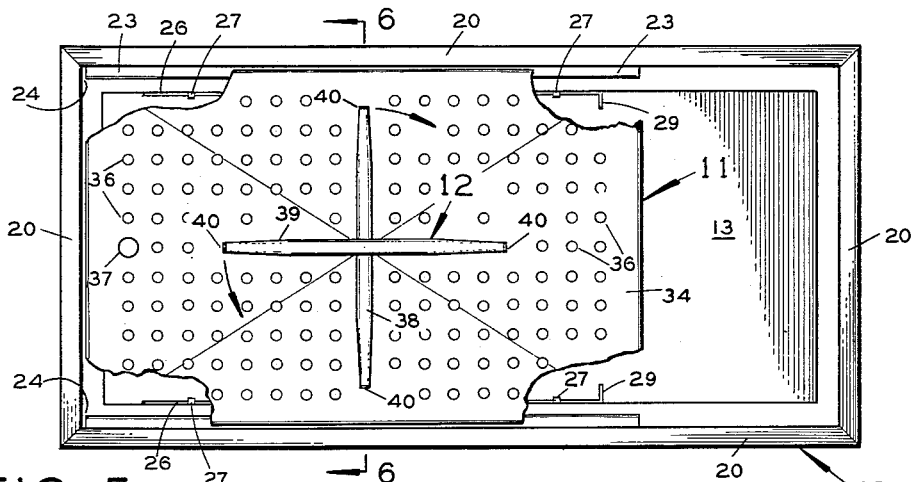
FIG. 5
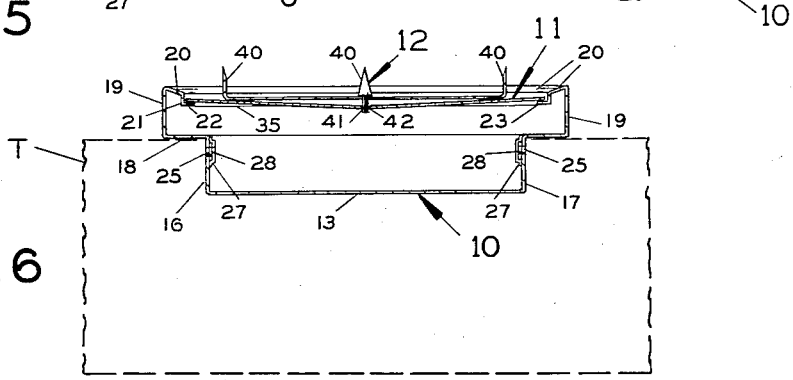
FIG. 6
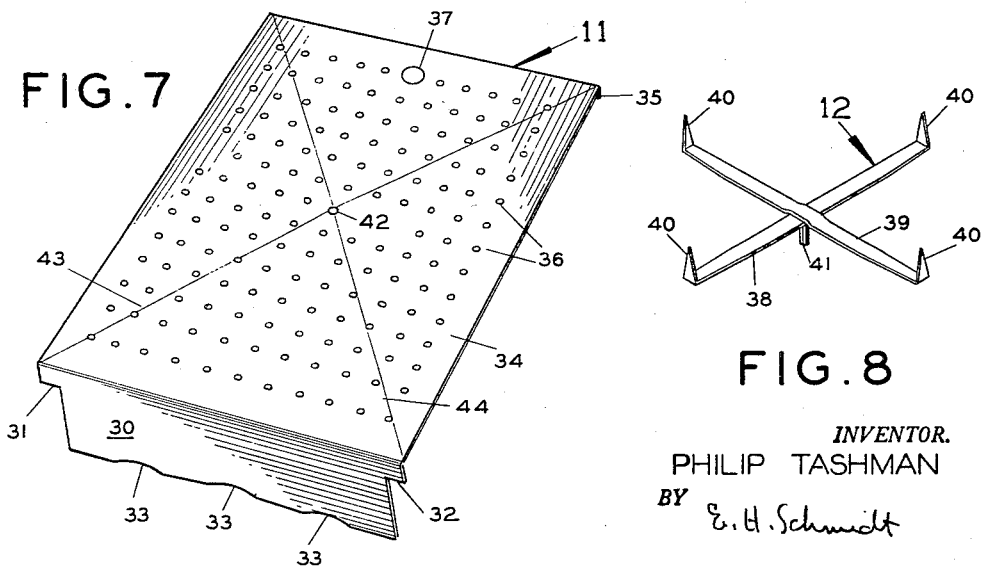
FIG. 7
FIG. 8
INVENTOR.
PHILIP TASHMAN
BY E. H. Schmidt
ATTORNEY

United States Patent Office 2,963,957
Patented Dec. 13, 1960

2,963,957

ROAST CARVING ASSEMBLY

Philip Tashman, 4800 Ronda, Coral Gables, Fla.

Filed Feb. 2, 1959, Ser. No. 790,485

6 Claims. (Cl. 99—421)

This invention relates to food serving apparatus and is directed particularly to an improved roast carving assembly which is especially well adapted for use in cafeteria serving counters.

The principal object of the invention is to provide a novel and improved meat or fowl roast carving assembly for cafeterias and the like which will keep the meat to be carved moist and temptingly hot while on display, and which holds the meat conveniently and adjustably so as to facilitate carving and serving.

A more particular object of the invention is to provide a roast carving assembly of the character described which comprises a base member adapted to fit into a serving counter opening and a perforated meat-holding plate removably fitted to the top of the base member, the base member having holes of adjustable size for admitting steam and hot vapor from the serving counter for passage through the perforations of the meat holding plate to surround the meat with moist air.

Another object is to provide a roast carving assembly of the above nature including means on the meat holding plate for revolvably securing the roast in place, so that it can be turned in one direction or the other as required for convenient and efficient carving.

Still another object is to provide a roast carving assembly of the above nature wherein the bottom of the base slants from back to front to provide a deep well at one end into which the meat juices will drain for ready use in basting or for gravy.

Still further objects are to provide a roast carving assembly of the character described which is comprised of securely interfitting parts that can readily be taken apart for cleaning and just as readily assembled again, which is attractive in appearance, inexpensive to manufacture, and highly efficient and durable in use.

Other objects, features and advantages of the invention will be apparent from the following description when read with reference to the accompanying drawings.

In the drawings, wherein like reference numerals denote corresponding parts throughout the several views:

Fig. 1 is a perspective view of a roast carving assembly embodying the invention, Fig. 2 is a vertical cross-sectional view of the roast carving assembly, taken along the line 2—2 of Fig. 1 in the direction of the arrows, Fig. 3 is vertical cross-sectional view taken along the line 3—3 of Fig. 2 in the direction of the arrows, Fig. 4 is a side elevational view of the base member, Fig. 5 is a top view, with portions broken away, of the roast carving assembly, Fig. 6 is a vertical cross-sectional view taken along the line 6—6 of Fig. 5 in the direction of the arrows, Fig. 7 is a perspective view of the meat holding plate shown separately, and Fig. 8 is a perspective view of the revolvable rack, shown separately.

Referring now in detail to the drawings, the novel roast carving assembly embodying the invention comprises, generally, a base member 10, a meat holding plate 11 and a revolvable rack 12, all preferably fabricated of stainless steel and securely held in interfitting relation as is hereinbelow described.

The base member 10, preferably formed of sheet stainless steel, comprises a rectangular bottom wall portion 13, downwardly-inclined from front to back, upstanding back and front wall portions 14 and 15, respectively, and side wall portions 16 and 17. The upper ends of the back and front wall portions 14 and 15 and side wall portions 16 and 17 meet in a common horizontal plane and are integrally formed with a rectangular, peripheral, outwardly-extending horizontal shoulder portion 18 of substantially uniform width. Upstanding from the outer periphery of the horizontal shoulder portion 18 is a rectangular upper wall portion 19. The upper wall portion 19 of the base member 10 is integrally formed with a narrow, downwardly and inwardly-inclined, rectangular, peripheral top wall portion 20, the inner ends of which are bent downwardly to provide short, vertical, inner wall portions 21. At each side of the base member 10, and extending from the rear thereof to about three-quarters its length, the inner wall portion 21 is formed with a pair of narrow, opposed, horizontally-bent shoulder strips 22, 23, for the purpose hereinafter appearing. As clearly shown in Fig. 5, there is a small space 24 left between the rear ends of the shoulder strips 22, 23 and the inner wall portion 21 at one rear end of the base member 10.

Means is provided for adjustably admitting steam and hot vapors from a steam table into the base member 10. To this end, the side wall portions 16 and 17 of the base member 10 are each provided, just beneath the horizontal shoulder portion 18 thereof and substantially coextensive with the shoulder strips 22, 23, with a plurality of equidistantly-spaced, round openings 25. As illustrated in Fig. 2, an adjustable closure strip 26 is slidably secured against the inside of each of the wall portions 16 and 17 along each group of openings 25 by means of U-shaped straps 27. The closure strips 26 are each provided with a plurality of round openings 28, of the same size as and mutually spaced the same as the openings 25, so that the openings 25 can be fully opened or variably closed by sliding adjustment of said strips. To facilitate the manual adjustment of the closure strips 27, each has an inwardly-bent handle portion 29 at one end.

The meat holding plate 11 is preferably integrally formed of sheet stainless steel and, as illustrated in Fig. 7, comprises an upstanding front wall portion 30, generally rectangular in shape and cut with a rectangular recess at each side to provide opposed shoulders 31, 32. A plurality of shallow, arcuate recesses 33 are cut into the lower edge of the front wall portion 30. The upper end of the front wall portion 30 of the meat holding plate 11 extends into a rectangular top portion 34, the rear edge of which is bent to provide a short, downwardly-extending lip 35. The rectangular top portion 34 of the meat holding plate 11 is perforated with rows of circular openings 36, a larger finger hole 37 being provided at a central position near the rear end of the top portion 34 to facilitate assembly and disassembly thereof with respect to the base member 10. As best illustrated in Figs. 1 and 5, the width of the top portion 34 of the meat holding plate 11 is such that it will fit between the front to back wall portions 21 and rest on the opposed shoulder strips 22, 23 of the base member 10. The downwardly-extending lip 35 of the meat holding plate 11 fits at each end into the spaces 24 between the shoulder strips 22, 23 and the inner wall portion 21 at the rear end of the base member 10, whereby said meat holding plate is locked at its rearmost position therein (see Figs. 2 and 6). In this position, the lower edge of the front wall portion 30 of the meat holding plate 11 extends to the top surface of the bottom wall portion 13 of the base member 10, and the shoulders 31, 32 of said meat holding plate rest against the shoulder portion 18 at each side of said base member (see Fig. 1).

The revolving rack 12 comprises a pair of crossed strips of steel 38, 39 welded together at their juncture and terminating at each end of each strip in an upstanding, sharply-pointed projection 40. Secured to and extending downwardly from the center of the crossed strips 38, 39 at the juncture thereof is a short, cylindrical pivot pin 41. The pivot pin 41 is adapted to fit into a central opening 42 in the top portion 34 of the meat holding plate 11, whereby the rack 12 is rotatively supported thereon. Preferably, the diameters of the pivot pin 41 and the opening 42 are somewhat larger than the perforation openings 36 in the top portion 34 of the meat holding plate 11, so that said pivot pin cannot fit into the openings 36.

As illustrated in Figs. 1, 5 and 7, the top portion 34 of the meat holding plate is preferably bent inwardly toward the center slightly, along diagonal crease lines 43, 44, to insure that drippings from the meat will flow towards the center and drop through the perforation openings 36 and into the base member 10.

In use, the roast carving assembly will be placed in the counter or steam table opening with the underside of the shoulder portion 18 of the base member 10 resting on the counter top T (see Figs. 2, 3 and 6). Steam and hot vapor will flow through the openings 25 in the side wall portions 16 and 17 of the base member 10 and into said base member, thence rising through the perforation openings 36 in the top portion 34 of the meat holding plate 11 to surround the roast impaled on the projections 40 of the revolving rack 12, thereby maintaining the meat moist and hot. Juices dripping from the meat will fall through the perforation openings 36 and flow down the inclined surface of the bottom wall portion 13 of the base member 10, through the arcuate recesses 33 in the lower edge of the front wall portion 30 of the meat holding plate 11 and into the open-topped well afforded by the space between said front wall portion and the front wall portion 15 of said base member, from which the juices can conveniently be ladeled for basting the meat or for serving gravy. It will be apparent that the roast or fowl being carved can readily be turned while on the rack 12 to facilitate carving. Another important advantage of the carving assembly resides in the fact that it can readily be disassembled and cleaned, and reassembled again for use.

While I have illustrated and described herein one form in which the invention may conveniently be embodied in practice, it is to be understood that this embodiment is presented by way of example only and not in a limiting sense. In short, the invention includes all the modifications and embodiments coming within the scope of the following claims:

What I claim as new and desire to secure by Letters Patent is:

1. In a roast carving assembly, the combination comprising a base member having a bottom wall, a front wall, a back wall and a pair of opposed side walls, all upstanding from said bottom wall to form an open-topped chamber in said base member, said base member being adapted to fit into an opening in a steam table and having shoulder means for supporting the upper end of said base member above the steam table surface, a perforated meat-holding plate of smaller front-to-back size than the open-topped chamber in said base member, means for removably supporting said meat-holding plate in the top of the chamber provided by said base member with the back end thereof adjacent the back end of said chamber, said means for removably supporting said meat holding plate comprising a pair of opposed, horizontal strips extending inwardly from the sides of said base member near the upper end thereof, said strips each being slightly spaced from the back end of said base member to provide a slot, the rear end of said meat holding plate having a short, turned-down lip portion the ends of which engage in said slots to limit horizontal motion of said meat holding plate with respect to said base member, said bottom wall being downwardly-inclined from back to front to provide an open-topped deep well in said chamber forwardly of said meat holding plate, and means for anchoring a roast upon said meat holding plate for carving, whereby juices draining from the roast will drop through the perforations in said meat-holding plate and flow into said well for use as gravy or for basting.

2. A coast carving assembly as defined in claim 1 including variable opening means in said side walls for admitting hot vapors from a steam table into said chamber for passage through the perforations in said meat-holding plate to surround the roast supported thereon.

3. A roast carving assembly as defined in claim 1 wherein said perforated meat-holding plate is bent downwardly at the center to cause the meat juices to flow in the central direction along the upper surface thereof.

4. A roast carving assembly as defined in claim 3 wherein said meat-holding plate further comprises a downwardly-extending, integrally-formed front wall portion extending to said bottom wall of said base member and operative to confine said hot vapors to the zone directly beneath said meat holding plate.

5. A roast carving assembly as defined in claim 4 wherein the lower end of said front wall portion is formed with a plurality of recesses providing passageway for juices flowing down said bottom wall into said well.

6. A roast carving assembly as defined in claim 1 wherein said meat anchoring means comprises a rack of crossed metal strips having a downwardly-extending central pivot pin and upwardly-extending pointed projections at the ends of said strips, and a central opening in said meat holding plate adapted to receive said pivot pin for rotatably supporting said rack.

References Cited in the file of this patent

UNITED STATES PATENTS

| | | |
|---|---|---|
| 495,821 | Martin | Apr. 18, 1893 |
| 831,088 | McCaugney | Sept. 18, 1906 |
| 1,086,940 | Ryon | Feb. 10, 1914 |
| 1,344,915 | Love | June 29, 1920 |
| 1,734,138 | Lehman | Nov. 5, 1929 |
| 2,459,657 | Klein | Jan. 18, 1949 |

FOREIGN PATENTS

| | | |
|---|---|---|
| 75,371 | Austria | Aug. 15, 1917 |